March 26, 1935. K. SCHREDER 1,995,626
MANUFACTURE OF MINIM ALCOHOL BEVERAGE
Filed Nov. 7, 1931
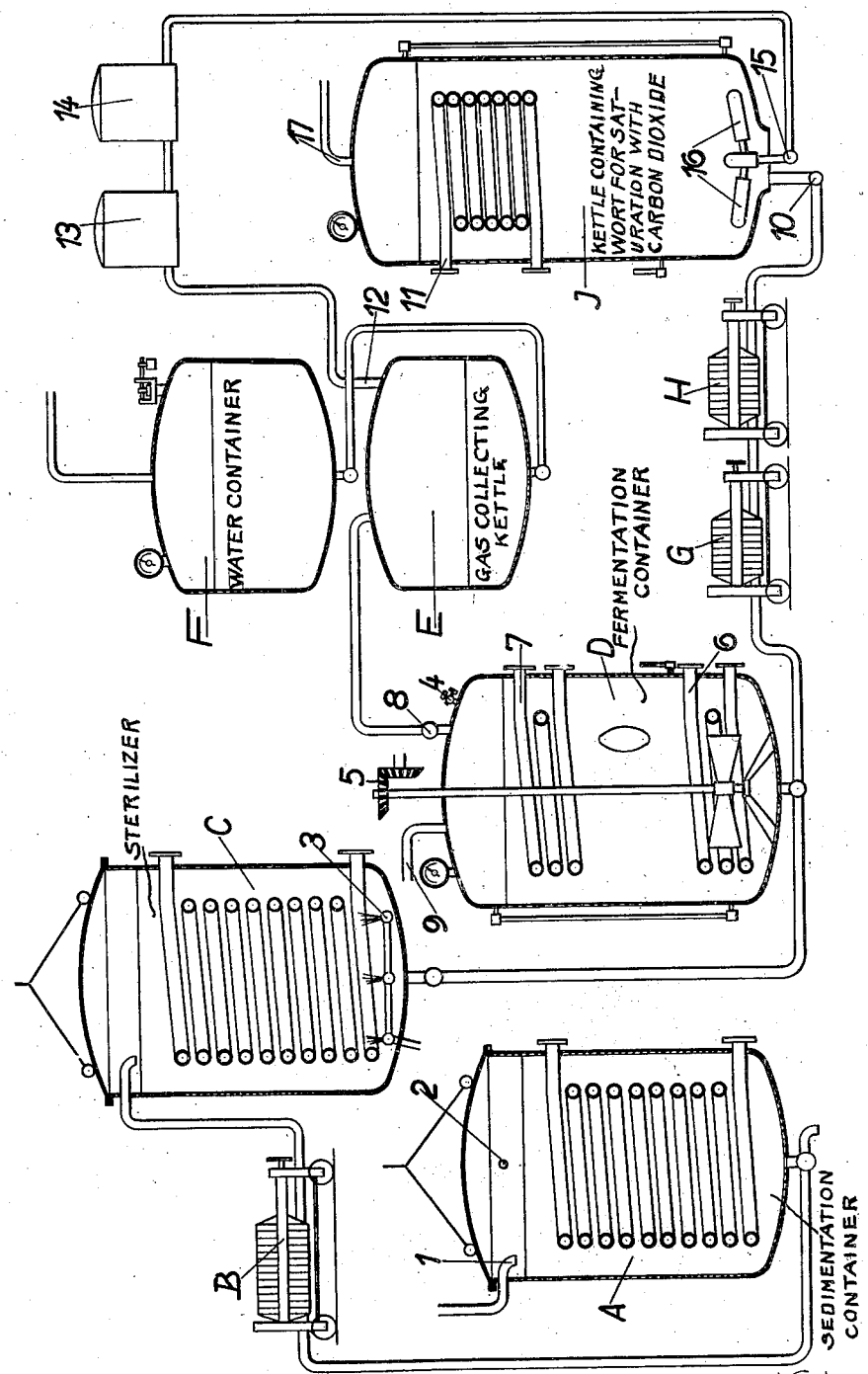
Karl Schreder
INVENTOR Patented Mar. 26, 1935

1,995,626

UNITED STATES PATENT OFFICE 1,995,626

MANUFACTURE OF MINIM ALCOHOL BEVERAGE

Karl Schreder, Vienna, Austria

Application November 7, 1931, Serial No. 573,702
In Austria July 14, 1931

3 Claims. (Cl. 195—1)

It has been found that Termobacterium mobile (Lindner) (Pseudomonas Lindneri-Kluyver) discovered by Professor Dr. Lindner is particularly suitable for the manufacture of beverages containing a low proportion of alcohol.

A process for the manufacture of beverages of this kind forms the subject-matter of the present application.

For obtaining a high grade end product it is essential that the preparation of the malt and of the wort be carried out carefully.

In the preparation of the malt which is obtained from barley according to the usual practice the temperature must not exceed about 17° C., and the period of germination must be at least 10 days in order to insure complete germination of the grain. The malt thus obtained in the form of grist is mashed with water, the temperature being maintained at 52° C. for extensive decomposition of proteins and then raised to 65° C. for saccharification. Lindner has found that Termobacterium mobile converts glucose, fructose and sucrose but not maltose into alcohol. For obtaining a low proportion of alcohol in the end product a small content of glucose in the wort is important and to obtain a product of high nutritive value, a high proportion of maltose and dextrin in the wort is important.

The wort thus obtained is freed to a great extent from albumen by an intense cooling followed by filtration, and after sterilization at about 70° C. is saturated with oxygen by blowing in air. A particularly favorable degree of saturation is obtained by starting the blowing-in of air at a temperature of 70° C. and continuing it until the temperature falls to about 20° C. The saturation of wort with oxygen prevents the end product from containing an undesired proportion of alcohol. The proportion of alcohol in the end product can be regulated by the percentage of saturation.

For the present process it is further essential that the carbon dioxide of fermentation should be collected and, after suitable purification in washing vessels, used for the carbonation of the finished beverage.

A method of carrying the process into effect will be described with reference to the accompanying drawing which shows diagrammatically an apparatus for carrying out this process.

The wort from the brewing house is admitted into the vessel A (a settling vessel with internal cooling) at 1 at a temperature of about 18° C. After A has been filled, the fresh water cooling is turned on and the wort is cooled to 1 to 2° C. The sediment precipitated is removed partly by settling, partly by filtering through the filter B with the assistance of compressed air which is admitted at 2, and the clear wort freed from albumen is conveyed into the sterilizer C and kept there for 30 minutes at 70° C. The wort which is thus sterilized and freed from albumen is slowly cooled to 28° C. by changing over the heating coil to fresh water cooling, and during the cooling fresh air is constantly blown through by means of a special nozzle system 3. When a temperature of 28°–30° C. is reached, the wort is forced into the fermenting vessel D which in the meantime has been sterilized with steam. After filling the same, the inoculation liquid (pure culture of Termobacterium mobile) is added through the inoculation cock 4, the whole is agitated with a stirring or mixing device 5, and the hot water heating coil 6 is turned on, care being taken to keep the temperature of the fermenting vessel constant at about 28° C. for the first six hours, later slowly raising it to 35° C. and then cooling down to 28° C. The end point of the fermentation can be exactly determined microscopically, the brisk movement of the bacteria ceasing completely when the fermentation is finished. The carbon dioxide generated passes through the opening 8 into the gas collecting vessel E and displaces the water contained therein into the vessel F situated above it, which is filled with compressed air and allows only enough air to escape through a safety valve to ensure a constant back pressure of 0.7 atmosphere.

After the fermentation is finished, the cooling coil 7 is switched on and the attenuated or finished wort is cooled to 1–2° C. After cooling, the gas collecting vessel E is disconnected at 8, and the contents of the fermenting vessel are forced, by supplying compressed air through the opening 9, through the cellulose filter G for the purpose of preliminary filtration and through the Seitz filter H for additional filtering, and are then collected in the storing and carbonating vessel J. The Seitz filter is a device manufactured by the Seitz Works at Kreuznach (Rhineland) Germany, and consists of a group of chambers for the unfiltered fluid and a group of chambers for the filtrate. Sterilizing films inserted between these groups of chambers consist of an asbestos composition. Owing to the smallness of the pores of these films, they retain all microorganisms such as bacteria, yeast, spores, etc., making possible mechanical sterilization of fluids without the application of heat. At the end of the filtration, the opening at 10 is closed, the cooling coil 11 is turned on and the liquid is cooled to 1–2° C. At the same time carbon dioxide from the gas collecting vessel E passes through the opening 12, the gas washing vessels 13 and 14 and the opening 15, and is forced through Berkefeld clay candles 16 into the vessel J. The six clay candles required are arranged in the form of a star on the bottom of the vessel. The forcing over of the carbon dioxide is effected by loading the sealing liquid in the vessel F with compressed air, and can be thereby set in an exact manner. After the transfer of the carbon dioxide is finished, the finished product can be drawn off by changing over the three-way cock 10 and introducing compressed air at 17.

The process according to the present invention requires a time of three days, starting with the preparation of the wort, to obtain the product ready for drawing off. This very short time as compared to other similar processes is very advantageous.

Termobacterium mobile herein referred to is fully described in Journal de Microbiologie, vol. IX, 1929, No. 1, pages 120–124, and 180, 181, Leningrad, U. S. S. R. Atlas der Mikroskopischen Grundlagen der Gärungsknude, 1928, plate 68, by Prof. Paul Lindner, the discoverer of the bacterium, in Prof. Lindner's "Mikroskopische und Biologische Betriebskontrolle in den Gärungsgewerben", Berlin, Paul Parey, 1930, 6th Edition, pages 585–590; Archiv für Mikrobiologie, 1931, vol 2, by Prof. Kluyver and Dr. Hoppenbrouwer, Compte Rendu Edition C., pages 172–175, of the International Dairy Congress held in Copenhagen, Denmark, in 1931; Dr. Neuberg's Biochemische Zeitschrift, 1931, vol. 243, Wochenschrift für Brauerei 1933, Nos. 6 and 11 and the fiftieth anniversary number issued in 1934, and in Berichten der Deutschen Botanischen Gesellschaft, 1931, vol. 49, No. 8.

Having now particularly described and ascertained the nature of my said invention and in what manner the same is to be performed, I declare that what I claim is:—

1. The process of making beverages of low alcoholic content comprising the following steps: mashing malt grist with water at about 52° C., raising the temperature of the mash to about 65° and mashing thereat, the wort thereby produced containing albumen, maltose and dextrose, inoculating the wort in a sterile condition with a pure culture of Termobacterium mobile and producing alcoholic fermentation thereof by the Termobacterium mobile.

2. The process according to claim 1 and in which the wort prior to the alcoholic fermentation is saturated with oxygen by blowing air through it, and at the same time cooled to about 28° C.

3. The process according to claim 1 and in which the wort, prior to the alcoholic fermentation, is cooled to about 2° C. and then filtered.

KARL SCHREDER.